(12) United States Patent
Kocherlakota

(10) Patent No.: US 6,785,705 B1
(45) Date of Patent: Aug. 31, 2004

(54) METHOD AND APPARATUS FOR PROXY CHAINING

(75) Inventor: Sitarama S. Kocherlakota, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/499,763

(22) Filed: Feb. 8, 2000

(51) Int. Cl.[7] .............................................. G06F 15/16
(52) U.S. Cl. ...................................... 709/203; 709/238
(58) Field of Search ................................ 709/238, 202, 709/203, 217, 247, 187.01, 200–3; 395/187.01; 713/171

(56) References Cited

U.S. PATENT DOCUMENTS

| | | | | |
|---|---|---|---|---|
| 5,321,841 A | * | 6/1994 | East et al. | 709/107 |
| 5,826,014 A | * | 10/1998 | Coley et al. | 713/201 |
| 5,974,566 A | * | 10/1999 | Ault et al. | 714/15 |
| 6,185,625 B1 | * | 2/2001 | Tso et al. | 709/247 |
| 6,345,303 B1 | * | 2/2002 | Knauerhase et al. | 709/238 |
| 6,584,567 B1 | * | 6/2003 | Bellwood et al. | 713/171 |

OTHER PUBLICATIONS deathr0w(firhawkNOfiSPAM@yifan.net.invalid), Chaining Proxies, alt.ph.uk, Dec. 9, 1999.*
Todd Booher (tbooher@novastar1.com), Chaining, microsoft.public.proxy, Jun. 8, 1999.*
Doron ben Avraham (kali@netvision.net.il), MS Proxy Chaining, Jan. 19, 1998.*

* cited by examiner

*Primary Examiner*—Kristine Kincaid
*Assistant Examiner*—Sindya Narayanaswamy
(74) *Attorney, Agent, or Firm*—Fitch, Even, Tabin & Flannery

(57) ABSTRACT

Methods and apparatus for establishing internet communication from a user to a server through a plurality of proxy servers are disclosed. The proxy servers are "chained" by establishing sessions among themselves and the user so that the benefits of more than one plural proxy server can be obtained by the user.

8 Claims, 4 Drawing Sheets

METHOD AND APPARATUS FOR PROXY CHAINING

BACKGROUND OF THE INVENTION

This invention relates to the use of web proxy servers by internet clients and more particularly, to the use of multiple such proxies contemporaneously.

The internet includes many different types of servers which provide special services to clients in session therewith. Included in these servers are proxies which provide services to a user but which do so by establishing sessions with web servers and responding to internet data from those web servers. In effect, the client accesses the internet "through" a proxy which provides value added to the information accessed.

As used herein, the term "internet" relates to any digital network giving a large number of users easy access to digital files of a variety of types. Thus the term includes the Internet of today as well as other types of digital networks.

One well known type of proxy server is the anonymity proxy, such as that available at www.lpwa.com. An anonymity proxy establishes a session with a client using the client's IP address and user information and requests information from the internet without identifying the requesting client. Thus, the value added is the anonymity of the client. Another possible type of proxy is a language proxy which, at the request of a client, will search for information in a preselected language and/or provide translations of identified files. A third type of proxy might be an efficiency proxy to protect against the delays of internet usage sometimes referred to as the world wide wait. An efficiency proxy may contain a local cache for storing frequently accessed files and it may reduce the size of files actually transmitted on to the client.

To use a server proxy, which may be a fee service, the client contacts the proxy for subscription purposes and satisfies conditions such as filling in a form and/or agreeing to conditions. Based on the conditions, the proxy may then grant permission to the client for future use. Such permission grant may include setting a cookie client's machine and/or providing a user name or password. Thereafter, the client accesses the proxy by sending the proxy's URL to the internet along with permission data from the client. The proxy responds to the URL and permission data by providing its service to client communications.

Proxy servers at present provide several different types of internet services to a client. In the near future it is expected that many types of proxy servers will be available for client use. The proxy services, however, can only be accessed one at a time. That is, only one proxy can be used by a client for a given communication session. What is needed in the art is a method of allowing the client to contemporaneously establish sessions through a plurality of proxies so that multiple proxy services may be used for the same communication.

SUMMARY OF THE INVENTION

The need in the art is met and a technical advance is achieved in accordance with the present invention. A proxy chaining method is described which includes initiating by a client a session with a first proxy server via the internet. The first proxy server receives as a part of the session communication, the identity at least a second proxy server and permission data to permit service to the client by the second proxy. After optional client authentication, the first proxy establishes a session with the identified second proxy server using the permission information from the client. After establishing sessions between the client, first proxy server and second proxy server, the client can access the internet by sending URLs through the chained first and second proxies. Should a third proxy be desired as a part of the chain of proxy servers, the client will initially identify such to the first proxy server and the first proxy server will establish a session with the third proxy via the second proxy server.

Advantageously, the first proxy, upon contact from the client, transmits an applet to the client which provides a GUI interface for the client to enter his or her permission and identification data such as login name and password. The applet may also read previously prepared proxy and client permission information from the client computer and populate appropriate text windows on the GUI interface. Further, the applet may read from the client computer certain session information, such as cookies, relating to communication between the identified proxies and the client. The session information then becomes a part of the permission data sent on to the proxies for later permission.

A first proxy server equipped to provide chaining services will receive a request from a client and in response thereto return an applet to the client computer for execution. The first proxy then receives the identities of further proxy servers and permission data associated with those proxy servers from the applet by establishing sessions with the additional proxy servers in sequence. After the establishment of proxy sessions the client can surf the web through the established chain of proxy servers.

BRIEF DESCRIPTION OF THE DRAWINGS

A more complete understanding of the invention may be obtained from consideration of the following description in conjunction with the drawing, in which.

DETAILED DESCRIPTION

Figure 1:
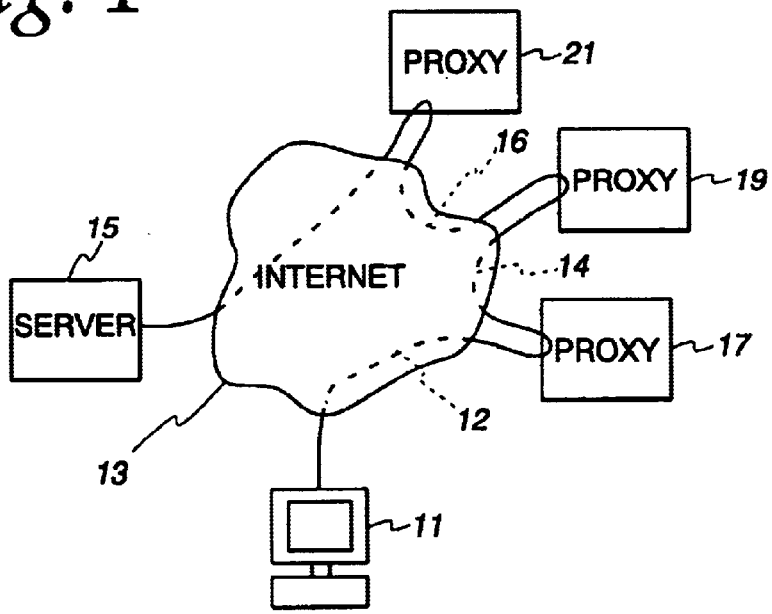
FIG. 1 shows an internet connection through a plurality of chained proxies.

FIG. 1 is a representation of a client computer 11 connected to the internet 13. Although shown as a direct connection, the connection to the internet 13 may be by means of a modem, dial-up connection and an internet service provider as is well known in the art. Also, shown in FIG. 1 is a web server 15 which is representative of any of the well known data file providers and, in fact, represents the universe of addressable web servers. Client 11 desires to take advantage of services provided by a plurality of web proxies. For example, the client wants to be anonymous so a connection via an anonymity web proxy 17 is desirable. Also, the client would like to search in the French language and therefore wants to take advantage of the language service provided by a French language web proxy 19. Lastly, the client would like to reduce the amount of time spent retrieving data so the services of a wait limiting proxy 21 are desired. FIG. 1 includes dotted line segments 12, 14 and 16 and solid line "loop" segments connecting each web proxy 17, 19 and 21 to the internet. These segments are functional in nature and illustrate the chained connection of the client 11 to the web server 15 via the chained proxies 17, 19 and 21. They do not necessarily represent actual physical connections.

The following is an example of how an access to web server 15 is accomplished via the three web proxies 17, 19 and 21. Before the actual sequential use of the multiple proxies, the client will have visited each directly and established any necessary relationship during the visits. It is likely that each proxy server will have stored session information in the client computer for future use. Such session information may be in the nature of a cookie which is set in the client computer 11 by means well known in the art. The session information and permission information will remain stored at the client computer as the example continues.

Figure 2:
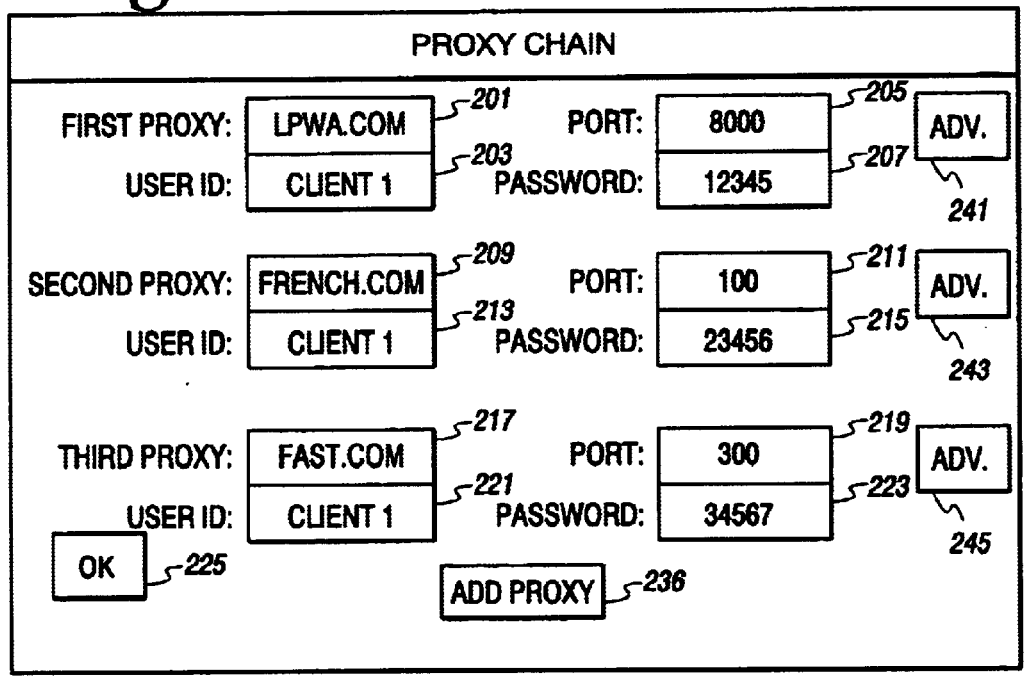
FIG. 2 shows an information window or form used in establishing a chain of proxies.
Figure 3:
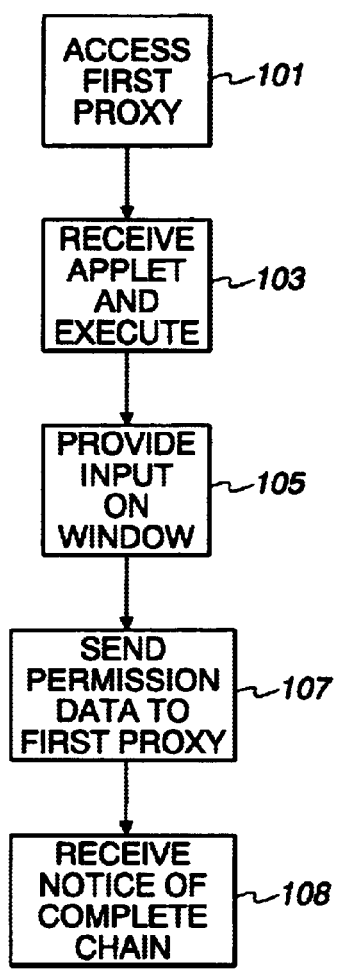
FIG. 3 is a flow diagram of client computer operations to establish a proxy chain.

The client first sends out the URL of the first proxy server 17 for anonymity services in step 101 of FIG. 3. Proxy server 17 receives the contact from client 11 and establishes a session (step 109, FIG. 4) between the client and proxy 17. As a part of the session, web proxy 17 returns an applet to client 11 where it is executed as is well known. The applet, which is received and executed in a step 103 (FIG. 3) presents a window as shown in FIG. 2, on the client computer. The applet window presents a number of information lines into which the client can enter identities of up to three proxy servers, the port number of each proxy server and an optional user name and password associated with each identified proxy server. Into information line 201 the user enters the URL of the first proxy server 17 and the port number 8000 of that server is entered onto line 205. The client then continues by entering a user name at line 203 and a password at line 207.

If the client wishes to not name any proxy servers beyond 17, he or she clicks the OK button 225 and the proxy chain information added to the information window will be sent to the first proxy server. If, on the other hand, the client wants to use a second proxy server, e.g. 19, the URL, port, user name and password for that proxy server are entered into lines 209, 211, 213 and 215 of the applet window of FIG. 2 before the OK button is checked. Similarly, if the client wants a third chained proxy, the URL, port, user name and password for the third proxy server are entered into information lines 217, 219, 221 and 223 of FIG. 2. Although FIG. 2 shows three proxy servers to be chained together a button 236 is provided which, when clicked, provides additional text windows (not shown), to name, other proxy servers to be chained and the permission data for use with the other proxies. The preceding example shows the manual entry of proxy information. After the proxy chain window is used to enter text, it may be stored in the client computer to be accessed by a proxy chain applet. Subsequently, the proxy chain applets can then read the stored proxy information and automatically load the text windows of the proxy chain window. The client is then free to edit the loaded information.

Figure 4:
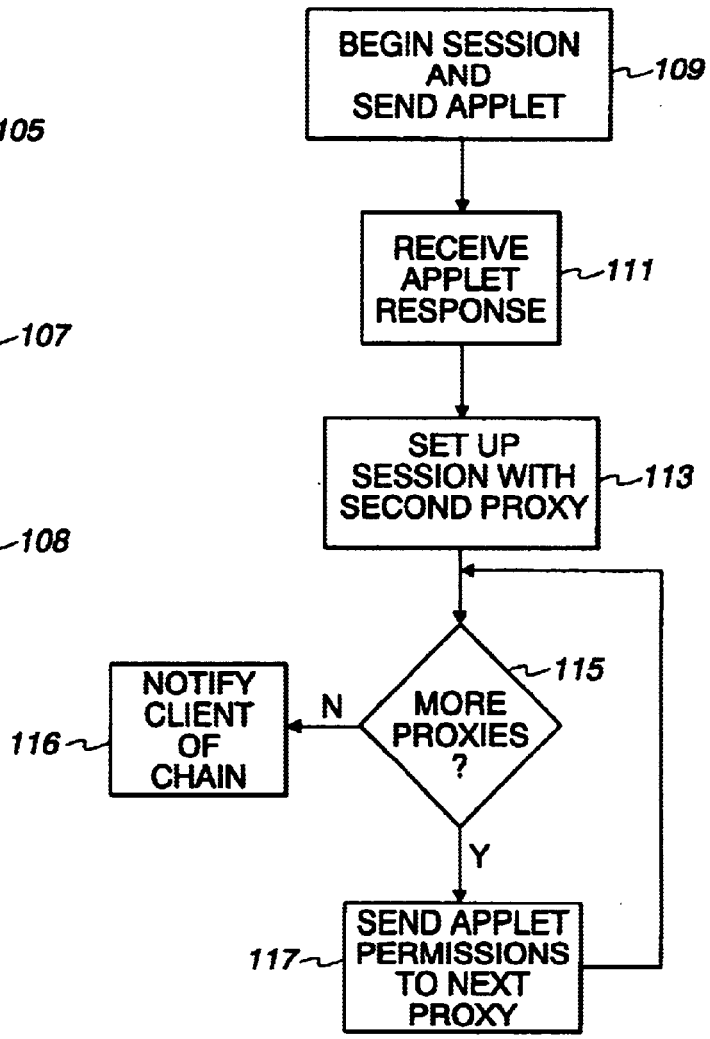
FIG. 4 is a flow diagram of procedures by a first proxy server to create a proxy chain.

At the completion of data entry to the applet window of FIG. 2, the client clicks the OK button 225, which causes the applet to access the session information (cookie) associated with each named proxy server and returns the cookies and all entered information to the first proxy in step 107 (FIG. 3). The applet information and relevant session information is then received by the first proxy server at step 111 (FIG. 4).

Figure 5:
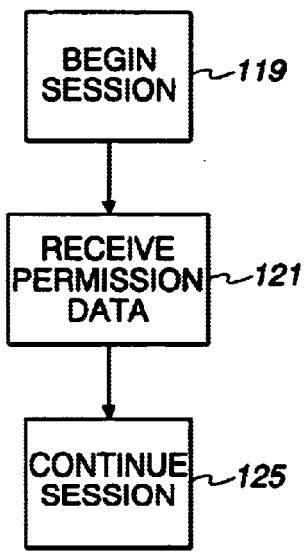
FIG. 5 is a flow diagram of procedures by a second proxy server to create a proxy chain.

Proxy server 17 analyzes the applet information and recognizes that a second proxy has been identified. In step 113 the proxy 17 contacts the named second proxy server, i.e., french.com, to establish a session therewith. The contact is received in step 119 (FIG. 5) and a session will be established in step 121 using the client provided applet response information for the second proxy as well as the cookie from the client computer 17 relating to french.com. This session is maintained in step 125. The first proxy server 17 then identifies in step 115 whether a third proxy has been named in the applet response information (FIG. 2). When no third proxy has been named, a session is maintained in step 116 among the client, proxy server 17, proxy server 19 and whatever web server, e.g. 15, is accessed by the client via the chained proxies. When, as in the present example, a third proxy server has been named, the flow proceeds from step 115 to step 117 in which the applet response information and associated session information is forwarded to the third proxy server 21 by the first proxy server 19. The third proxy server begins a session from the client which is linked through the first proxy server 17 and second proxy server 19. As with the first and second proxy servers, the third proxy server uses the applet response information to establish a session. When the third proxy session is established, a session continues (step 125) between the client and a web server, e.g. 15, through proxy servers 17, 19 and 21. The third proxy server establishes the session in a manner substantially similar to FIG. 5.

After the proxy chain has been established, the URL of web server 15, or any other web server, can be sent from the client to the internet via the chained proxies 17, 19 and 21. The proxy 17 provides the necessary anonymity to the chain, the language proxy 19 provides the French language features and the wait avoidance proxy 21 provides its function for packets transmitted on the chain.

Figure 6:
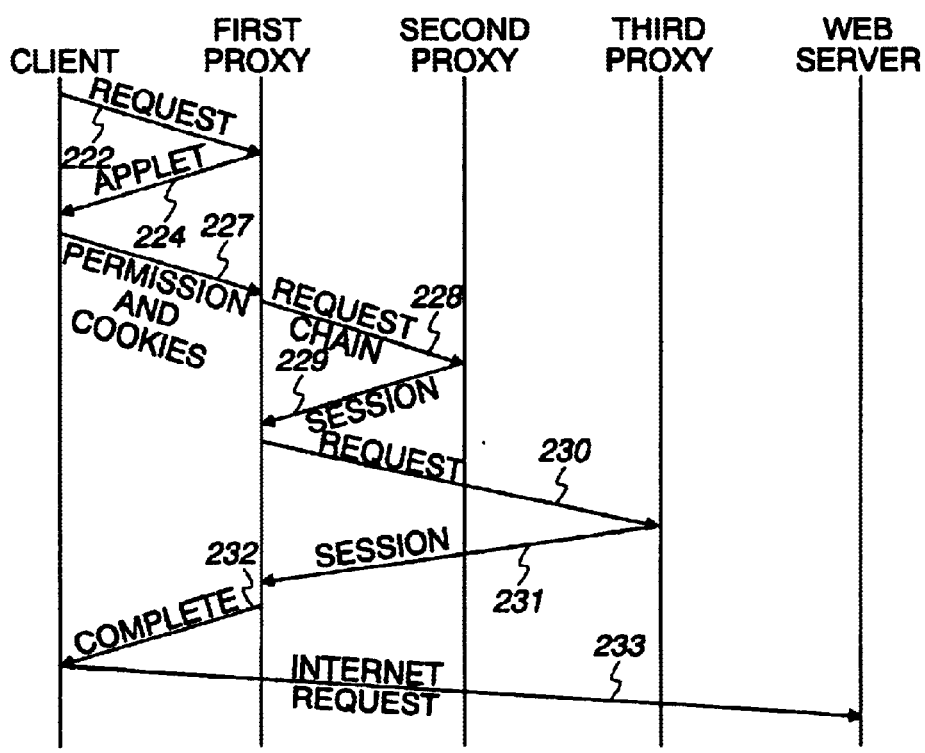
FIG. 6 is a message sequence diagram.

FIG. 6 represents relevant portions of the message sequence among the client, web proxies and web server to establish and use chained proxies to access the internet. Initially, a request 222 for proxy use is sent from the client to the first proxy. The first proxy optionally authenticates the request and returns an applet 224 with which to identify further proxies and permission data associated with those proxies. The identities and permission data are then sent 227 to the first proxy which parses the message and begins to establish sessions with the additional proxies. A request is sent 228 to the second proxy which authenticates it and returns a message 229 to the first proxy signifying the session establishment. The first proxy then sends a message 230 to the third proxy requesting a session. The third proxy responds by returning a session message 231 to the first proxy and the first proxy signifies 232 to the client that the chain is complete. Thereafter, the client may access a web server via the chain of proxies as represented by message 233.

Figure 7:
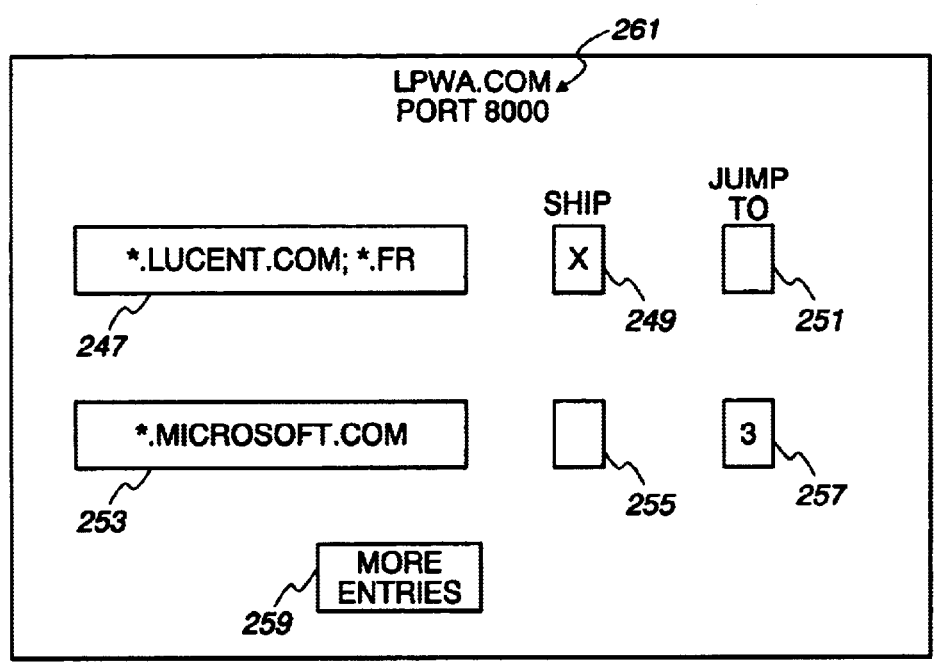
FIG. 7 is an optional advanced features window.

The preceding example of FIG. 2 relates to the standard features of proxy chaining. The chaining applet may also provide advanced features to the users who want to take advantage of them. As shown in FIG. 2, an advanced feature button is present at the end of each row of proxy information. Advanced feature button 241 is present in the first proxy row, advanced feature button 243 is present in the second proxy row and advanced feature button 245 is present in the third proxy row. Clicking an advanced feature button causes the applet to present an advanced feature window (FIG. 7) which relates to the proxy row including button. For example, clicking advanced feature button 241 results in a window as shown in FIG. 7 on which the user can enter advanced feature definitions relative to the first proxy. If advanced features are desired for the second and/or third proxies, then buttons 243 and/or 245 are clicked. The window of FIG. 7 relates to the first proxy lpwa.com which name and port number are displayed at 261. The window initially presents to the user two rows of text windows and control boxes. A first row begins with a long text window 247, a check box 249 and a small text window 251. The text window 247 is used to enter URL's for which the first proxy is to be skipped or a "jump to" command is to be entered. URL's are typed into the text window 247 and the either the skip box 249 is checked or a jump to number is entered in text box 251. Text windows 253 and 257 and check box 255 provide the same set of advanced features for another URL or URL's entered into text window 253. If more URL's require advanced features at the first proxy, then a button 259 is clicked to present new rows of control boxes such as 253, 255 and 257. As shown in FIG. 7, when a URL matching *.lucent.com or *.fr is transmitted to the first proxy, the services of that proxy are to be skipped as defined by the "x" in box 249. Similarly, whenever a URL of *.companyx.com is sent to the first proxy, the first proxy will skip the second proxy and jump to the third proxy because the number 3 is entered into the jump to box 251. The advanced features allow the user to define which proxy servers are employed for predetermined URL's.

It is to be understood that the above-described embodiment is merely illustrative of the principles of the invention and that variations may be devised by those skilled in the art without departing from the scope of the invention. It is intended that such variations be included within the scope of the claims.

What is claimed is:

1. A proxy chaining method for use by a client for sequential interaction with a plurality of internet web proxy servers comprising:

initiating by the client a session with a first proxy server;

receiving from the first proxy server at the computer of the client a request for identities of additional proxy servers for a proxy chain;

providing, by the client in response to the request for identities, data identifying a second proxy server and client permission data associated therewith;

transmitting the data identifying the second proxy server and the client permission data to the first proxy server;

sending by the first proxy server a request for session with the second proxy server, the request for session including client permission data provided by the client;

providing by the client, before sending a second proxy identity identifying the second proxy server and permission data to the first proxy server, data identifying a third proxy server and client permission data associated with the third proxy server; and the first proxy server further responds to the data identifying the second proxy server and client permission data by transmitting to the second proxy server the identity of the third proxy server and the client permission data associated with the third proxy server.

2. A method in accordance with claim 1 wherein the client permission data associated with the second proxy server includes client session information.

3. A method in accordance with claim 2 wherein the client session information associated with the second proxy server comprises a cookie previously set by the second proxy server.

4. A method in accordance with claim 1 comprising accessing by the client a file from an internet web server via the first and second proxy servers.

5. A method in accordance with claim 1 comprising establishing a session between the second proxy server and the third proxy server using the client permission data associated with the third proxy server.

6. A method in accordance with claim 1 comprising accessing by the client a file from an internet web server via the first, second and third proxy servers.

7. A method in accordance with claim 5 wherein the client permission data associated with the second proxy server includes client session data.

8. A method in accordance with claim 5 wherein the client permission data associated with the second proxy server comprises a cookie previously set by the second proxy server.

* * * * *